(12) United States Patent
Power (10) Patent No.: US 10,140,797 B2
(45) Date of Patent: Nov. 27, 2018

(54) METHOD AND SYSTEM FOR ISOLATION MANAGEMENT AND OR ACCESS CONTROL

(71) Applicant: ISOL8 Pty Ltd, Guildford (AU)

(72) Inventor: Stephen Craig Power, Guildford (AU)

(73) Assignee: ISOL8 Pty Ltd, Guildford (AU)

( * ) Notice: Subject to any disclaimer, the term of this patent is extended or adjusted under 35 U.S.C. 154(b) by 0 days.

(21) Appl. No.: 15/525,612

(22) PCT Filed: Nov. 27, 2015

(86) PCT No.: PCT/AU2015/050751
§ 371 (c)(1),
(2) Date: May 10, 2017

(87) PCT Pub. No.: WO2016/082005
PCT Pub. Date: Jun. 2, 2016

(65) Prior Publication Data
US 2018/0012434 A1    Jan. 11, 2018

(30) Foreign Application Priority Data

Nov. 27, 2014  (AU) ................................ 2014904800
Jun. 18, 2015  (AU) ................................ 2015902338

(51) Int. Cl.
*G07C 9/00* (2006.01)
*E05B 19/00* (2006.01)
(Continued)

(52) U.S. Cl.
CPC ...... *G07C 9/00896* (2013.01); *E05B 19/0005* (2013.01); *E05B 47/00* (2013.01);
(Continued)

(58) Field of Classification Search
CPC ............ G07C 9/00182; G07C 9/00896; G07C 2009/00769; G07C 2009/00865;
(Continued)

(56) References Cited

U.S. PATENT DOCUMENTS

2004/0219903 A1* 11/2004 Despain ............. G07C 9/00023
455/410
2006/0255119 A1* 11/2006 Marchasin ............ B60R 25/093
235/375

(Continued)

*Primary Examiner* — Paultep Savusdiphol
(74) *Attorney, Agent, or Firm* — IP Attorneys Group, LLC (57) ABSTRACT

A system of isolation management comprises a computer for generating an isolation plan; a lockbox configured to receive the isolation plan from the computer; a mobile device associated with an individual, and one or more locks for isolation locking of an asset by each individual according to the isolation plan. The mobile device is allocated to the lockbox according to the isolation plan. The lockbox is configured to recognise the mobile device when proximal to the lockbox. The one or more isolation locks are removably housed in the lockbox. The one or more isolation locks are each able to be recognised by the mobile device and the mobile device is configured to record an association of one or more of the isolation locks to the mobile device according to the isolation plan. There is also an isolation point for isolating the asset with the one or more isolation locks according to the isolation plan. The isolation point is able to be recognised by the mobile device.

16 Claims, 6 Drawing Sheets

(51) Int. Cl.
  *E05B 47/00* (2006.01)
  *F16P 3/08* (2006.01)
  *G05B 19/406* (2006.01)
  *E05B 67/38* (2006.01)

(52) U.S. Cl.
  CPC ............... *E05B 67/38* (2013.01); *F16P 3/08* (2013.01); *G05B 19/406* (2013.01); *G07C 9/00182* (2013.01); *G07C 9/00571* (2013.01); *E05B 2047/0094* (2013.01); *E05B 2067/386* (2013.01); *G07C 2009/00507* (2013.01); *G07C 2009/00936* (2013.01)

(58) Field of Classification Search
  CPC ... G07C 2009/00936; E05B 2047/0094; E05B 2047/0095
  USPC ...................................... 235/375, 382, 382.5
  See application file for complete search history.

(56) References Cited

U.S. PATENT DOCUMENTS

| | | | | |
|---|---|---|---|---|
| 2007/0145113 A1* | 6/2007 | Keller | .................... | G06K 17/00 235/377 |
| 2008/0258869 A1* | 10/2008 | Ognjenovic | ........... | A47G 29/10 340/5.73 |

\* cited by examiner

METHOD AND SYSTEM FOR ISOLATION MANAGEMENT AND OR ACCESS CONTROL

CROSS-REFERENCE TO RELATED APPLICATIONS

This application is a National Phase Entry of International Application No. PCT/AU2015/050751, filed Nov. 27, 2015 and titled "Method and System for Isolation Management and or Access Control," which claims priority to and the benefit of Australian Patent Application No. 2014904800, filed Nov. 27, 2014 and titled "iSOL8 is the collective name for a product comprised of smart lock boxes, RFID tagged isolation points, NFC enabled mobile devices, and a web based database system for collective management of isolation permits and isolation planning." International Application No. PCT/AU2015/050751 also claims priority to and the benefit of Australian Patent Application No. 2015902338, filed Jun. 18, 2015 and titled "Method and System for Isolation Management and or Access Control." The contents of the above-identified Applications are relied upon and incorporated herein by reference in their entireties.

FIELD OF THE INVENTION

The present invention relates to a method and system for isolation management of and or access control to physical assets.

BACKGROUND

Typically industrial and research worksites have fixed assets comprising machinery or equipment which may be complicated and potentially dangerous, such as by way of example, ore crushers or particle accelerators. Before permitting access for service or repair of such fixed assets, it is necessary to create a safe working environment prior to the commencement of the work. This is achieved for example, by isolating energy sources to the asset and or by physically isolating parts of the fixed asset to render it inoperable. Once the asset is safe access can be permitted.

An example standard safety procedure for creating such a safe working environment comprises:
 Identify an asset assigned with a maintenance/repair task;
 Identify the supervisor of personnel working on the maintenance/repair task;
 Identify personnel working at the worksite;
 Identify an associated set of isolation points for the asset;
 Prepare an isolation plan for the maintenance/repair task and manage a multi-level authorisation to the isolation plan;
 Assign an isolation supervisor to the isolation plan;
 Assign a lockbox and a number of qualified personnel to the isolation plan;
 Print hardcopies of the isolation permit for the isolation supervisor and the qualified personnel;
 Track the issue of isolation locks and lock keys to the qualified personnel;
 Identify and track personnel who are currently working on the task specified in the isolation plan;
 Record the completion of an isolation covering all isolation points;
 Record the return of lock keys to the lockbox;
 Start the maintenance/repair task;
 Record the completion of the maintenance/task;
 Track the re-issue of lock keys from the lockbox;
 Record the return of isolation locks and lock keys to the lockbox;
 Record the de-isolation of the equipment covering all isolation points;
 Provide for supervisory over-ride of isolation lock-out with authorisation steps;
 Record the return of asset back to service.

Conventionally, the standard safety procedure is implemented using a paper based process, wherein personnel must carry paper documents outlining the maintenance/repair task and information relating to isolation points. They must continually write down information required to monitor the status of the isolation plan. This is a laborious process which is both time inefficient and provides opportunity for human error to occur.

A number of software based systems have been developed in order to reduce the amount of documentation required and reduce the chances of incorrect information being generated and/or recorded. These systems incorporate a server having a database of records and a number of portable devices for providing information to isolation supervisors and workers. The server is capable of generating isolation plans, instructions and permits to work. Additionally, the server is able to determine which service personnel are qualified to be assigned the role of the isolation supervisor and the qualified personnel. The portable devices are designed to receive isolation plans and associated instructions from the server. The portable devices typically have physical or touch based user input to allow the isolation supervisor and the qualified staff members to manually update the database. However, the manual updating of the database using user input still incurs time inefficiency and opportunities for human error.

It would be advantageous if a method and system for isolation management was provided that overcame the problems discussed above or which is at least a useful alternative to those methods that have been known.

In this specification the terms "comprising" or "comprises" are used inclusively and not exclusively or exhaustively.

Any references to documents that are made in this specification are not intended to be an admission that the information contained in those documents form part of the common general knowledge known to a person skilled in the field of the invention, unless explicitly stated as such.

SUMMARY OF THE INVENTION

According to a first aspect of the invention, there is a system of isolation management comprising:
 a computer for generating an isolation plan;
 a lockbox configured to receive the isolation plan from the computer;
 a mobile device associated with each of one or more individuals, the or each mobile device being allocated to the lockbox according to the isolation plan, wherein the lockbox is configured to recognise the or each mobile device when proximal to the lockbox;
 one or more locks for isolation locking of an asset by each individual according to the isolation plan, the one or more isolation locks removably housed in the lockbox,
 wherein the one or more isolation locks are each able to be recognised by the or each mobile device and the or each mobile device is configured to record an association of one or more of the isolation locks to the respective mobile device according to the isolation plan;

an isolation point for isolating the asset with the one or more isolation locks according to the isolation plan, the isolation point is able to be recognised by the or each mobile device;

whereby in use the lockbox records recognition of the or each mobile device and the association of the or each mobile device to the lockbox, the or each mobile device records recognition of the one or more isolation locks and association of the one or more isolation locks to the or each mobile device, the or each mobile devices records recognition of the isolation point and the one or more isolation locks and association of the isolation point to the one or more isolation locks when the one or more isolation locks are used to isolate the isolation point.

In an embodiment, the system further comprises one or more keys for the locks, the one or more keys being removably housed in the lockbox, wherein the or each mobile device is configured to recognise each of the one or more keys.

In an embodiment, the lockbox is configured to recognise the presence or absence of each of the one or more isolation locks and or each of the one or more keys.

In an embodiment, the lockbox is configured to communicate to the computer the presence or absence of the one or more isolation locks and or the one or more keys.

In an embodiment, the server is configured to inform an authorised person of the implementation of the plan after receiving communication from the lockbox.

In an embodiment, the server is configured to inform an authorised person of the implementation of the plan after receiving communication from the or each mobile device.

In an embodiment, the lockbox further comprises a printer to print a hardcopy of the isolation plan.

According to a second aspect of the invention, there is a system of isolation management comprising:

a computer for generating an isolation plan, the isolation plan comprising a plan for de-isolation of an isolated asset;

a lockbox configured to receive the isolation plan from the computer;

a mobile device associated with an individual, the mobile device being allocated to and associated to the lockbox according to the isolation plan, wherein the lockbox is configured to recognise the mobile device when proximal to the lockbox;

one or more isolation locks for isolation locking of an asset according to the isolation plan, the one or more isolation locks able to be housed in the lockbox, wherein the one or more isolation locks each able to be recognised by the mobile device and are associated to the mobile device according to the isolation plan;

an isolation point being isolated with the one or more isolation locks according to the isolation plan, the isolation point is able to be recognised by the mobile device, the isolation point associated to the one or more isolation locks isolating the isolation point;

whereby in use the mobile device is arranged to record recognition of the isolation point and the one or more isolation locks isolating the isolation point when the isolation point is de-isolated from the one or more isolation locks thereby de-associating the one or more isolation locks with the one or more isolation points, the mobile device is able to record recognition of the one or more isolation locks when the one or more isolation locks are housed in the lockbox thereby de-associating the one or more isolation locks from the mobile device, and wherein the lockbox is able to record recognition of the mobile device thereby de-association the lockbox from the mobile devices.

According to a third aspect of the invention, there is a computer for implementing isolation management of an asset comprising:

a processor for generating an isolation plan;

a transmitter for sending the isolation plan to a lockbox;

a transmitter for sending the isolation plan to a mobile device associated with an individual, wherein the isolation plan comprises an allocation of the mobile device to the lockbox so that the lockbox can recognise the mobile device when proximal to the lockbox;

wherein the isolation plan comprises an allocation of one or more isolation locks removably housed in the lockbox for isolation locking of an asset by each individual to a respective isolation point of the asset, so that the one or more isolation locks may be recognised by the mobile device, and so that the one or more isolation points may be recognised by the mobile device;

a receiver for receiving a recognition message from the lockbox when the lockbox recognises the mobile device;

a receiver for receiving a recognition message from the mobile device when the mobile device recognises the one or more isolation locks; and a receiver for receiving a recognition message from the mobile device when the mobile device recognises the one or more isolation locks.

In an embodiment the computer comprises a receiver for receiving a message from the lockbox when the one or more locks are removed from the lockbox.

In an embodiment the isolation plan comprises an allocation of one or more keys to the mobile device so that the one or more keys may be recognised by the mobile device, the keys for opening the locks and being removably housed in the lockbox. In an embodiment the computer further comprises a receiver for receiving a recognition message from the mobile device when the mobile device recognises the one or more keys. In an embodiment the computer comprises a receiver for receiving a message from the lockbox when the one or more keys are removed from the lockbox.

In an embodiment the computer comprises a receiver for receiving a message from the mobile device when the lock is removed from the isolation point.

In an embodiment the computer comprises a receiver for receiving a message from the lockbox when the one or more locks are returned to the lockbox.

According to a fourth aspect of the invention, there is a lockbox for housing one or more isolation locks used in access control of an asset, said lockbox comprising:

a receiver for receiving an isolation plan from a computer;

wherein the isolation plan comprises an allocation of one or more mobile devices to the lockbox, wherein the lockbox is configured to recognise the one or more mobile devices when proximal to the lockbox;

wherein the one or more locks are removably housed in the lockbox;

whereby in use the lockbox is configured to associate with the recognised the mobile device and permit access to the one or more locks.

In an embodiment the lockbox is configured to send a message to the computer reporting association of the mobile device with the lockbox.

In an embodiment the lockbox is configured to recognise removal of each of the locks from the lockbox. In an embodiment the lockbox is configured to record the removal of each lock by the person allocated with the associated mobile device. In an embodiment the lockbox is configured to send a message to the computer reporting removal of the lock from the lockbox and the associated mobile device.

In an embodiment the lockbox is configured to recognise return of each of the lock to the lockbox. In an embodiment the lockbox is configured to record the return of each lock by the person allocated with the associated mobile device. In an embodiment the lockbox is configured to send a message to the computer reporting return of the lock to the lockbox and the associated mobile device.

In an embodiment the lockbox is configured to de-associate with the recognised the mobile device when the mobile device is again recognised and the locks are returned.

In an embodiment the lockbox is configured to send a message to the computer reporting de-association of the mobile device with the lockbox.

According to a fifth aspect of the invention, there is a mobile device associated with an individual for use in a system of isolation management, the mobile device comprising:
a receiver for receiving an isolation plan from a computer, wherein the isolation plan comprises an allocation of the mobile device to a lockbox;
a recognition indicium for the lockbox to recognise the mobile device when proximal to the lockbox;
a scanner for recognising one or more locks for isolation locking of an asset which are removably housed in the lockbox,
wherein the mobile device is configured to record an association of one or more of the isolation locks to the mobile device according to the isolation plan;
a scanner for recognising an isolation point for isolating the asset with the one or more isolation locks according to the isolation plan;
whereby in use the mobile device is able to be recognised by the lockbox so as to give access to the locks by the individual allocated with mobile device records;
the mobile device records recognition of the one or more isolation locks and association of the one or more isolation locks to the mobile device,
the mobile devices records recognition of the isolation point and the one or more isolation locks and association of the isolation point to the one or more isolation locks when the one or more isolation locks are used to isolate the isolation point.

In an embodiment the mobile device is configured to send a message to the computer reporting association of the mobile device with the lockbox.

In an embodiment the mobile device is configured to send a message to the computer reporting association of mobile device and the lock.

In an embodiment the mobile device is configured to send a message to the computer reporting association of mobile device and the isolation point.

In an embodiment the mobile device is configured to record recognition of the isolation point and the one or more isolation locks when the lock is removed from the isolation point so as to create a de-association of the isolation lock to the isolation point.

In an embodiment the mobile device is configured to send a message to the computer reporting de-association of mobile device and the isolation point.

In an embodiment the mobile device is configured to record association of each lock with the lockbox when the lock is returned to the lockbox. In an embodiment the mobile device is configured to send a message to the computer reporting return of the lock to the lockbox.

In an embodiment the recognition indicium also for the lockbox to recognise the mobile device when proximal to the lockbox after return of the lock so that the lockbox can de-associate with the mobile device.

According to a sixth aspect of the invention, there is a method of isolation management comprising:
generating an isolation plan;
communicating the isolation plan to a lockbox, the lockbox containing one or more isolation locks for isolation locking;
allocating a mobile device to the lockbox according to the isolation plan;
recognising that the mobile device is proximal to the lockbox and recording recognition of the mobile device with the lockbox;
associating the mobile device to the lockbox after recordal of recognition of the mobile device;
allocating one or more isolation locks to the mobile device according to the isolation plan;
recording recognition of the one or more locks with the mobile device, wherein the one or more locks are each able to be recognised by the mobile device;
associating the one or more locks with the mobile device after recordal of recognition of the locks;
isolating an isolation point with the one or more isolation locks according to the isolation plan;
recording recognition of the isolation point with the mobile device, wherein the isolation point is able to be recognised by the mobile device;
recording recognition of the one or more isolating locks used to isolate the isolation point, with the mobile device;
associating the isolation point to the one or more locks used to isolate the isolation point.

In an embodiment, the method further comprises the mobile device communicating to the server recordal of recognition and associations of the one or more locks to the isolation point.

In an embodiment, the method further comprises the recording recognition of the one or more keys for the locks, wherein the one or more keys are each able to be recognised by the mobile device and associated to the mobile device after recordal of recognition.

In an embodiment, the method further comprises recognising the presence or absence of the one or more isolation locks and or the one or more keys by the lockbox.

In a preferred embodiment, the method further comprises communicating to the server the presence or absence of the one or more isolation locks and the one or more keys by the lockbox.

In a preferred embodiment, the communicating to the server the presence or absence of the one or more isolation locks and the one or more keys by the lockbox causes the server to inform an authorised staff member of the progress in implementation of the isolation plan.

In a preferred embodiment, the communicating to the server the association of the lock to the isolation point causes the server to inform an authorised staff member of the progress in implementation of the isolation plan.

In an embodiment, the method further comprises allocating the one or more locks and or the one or more keys to the mobile device, according to the isolation plan.

In an embodiment, the method further comprises printing a hardcopy of the isolation plan with the lockbox.

According to a seventh aspect of the invention, there is a method of isolation management comprising:

generating an isolation plan including de-isolation of isolated isolation points;
communicating the isolation plan to a lockbox, the lockbox for housing one or more isolation locks for isolation locking;
associating a mobile device to the lockbox and the one or more isolation locks according to the isolation plan;
recording recognition of an isolation point and the one or more isolation locks used to isolate the isolation point, using the mobile device;
disassociating the isolation point from the one or more isolation locks used to isolate the isolation point;
returning the one or more isolation locks to the lockbox;
recording recognition of the one or more isolation locks with the mobile device;
disassociating the one or more isolation locks from the mobile device;
recording recognition of the mobile device with the lockbox;
disassociating the mobile device from the lockbox.

According to an eighth aspect of the invention, there is a method of isolation management comprising:
generating an isolation plan;
communicating the isolation plan to a lockbox, the lockbox containing one or more isolation locks for isolation locking;
receiving an allocation of a mobile device to the lockbox according to the isolation plan;
recognising that the mobile device is proximal to the lockbox and recording recognition of the mobile device with the lockbox;
associating the mobile device to the lockbox after recordal of recognition of the mobile device;
permitting access to one or more isolation locks housed in the lockbox.

In an embodiment the method further comprises sending a message to the computer reporting association of the mobile device with the lockbox.

In an embodiment the method further comprises recognising removal of one of more of the locks from the lockbox. In an embodiment the method further comprises recording removal of each lock by the person allocated with the associated mobile device. In an embodiment the method further comprises sending a message to the computer reporting removal of each lock from the lockbox and the associated mobile device.

In an embodiment the method further comprises recognising return of each of the locks to the lockbox. In an embodiment the method further comprises recording the return of each lock by the person allocated with the associated mobile device. In an embodiment the method further comprises sending a message to the computer reporting return of each lock to the lockbox and the associated mobile device.

In an embodiment the method further comprises de-associating the lockbox with the recognised the mobile device when the mobile device is again recognised and the locks are returned.

In an embodiment the method further comprises sending a message to the computer reporting de-association of the mobile device with the lockbox.

According to a ninth aspect of the invention, there is a method of isolation management comprising:
generating an isolation plan;
sending the isolation plan to a lockbox, the lockbox containing one or more locks for isolation locking;
allocating a mobile device to the lockbox according to the isolation plan;
allocating one or more locks to the mobile device according to the isolation plan;
receiving a message indicating that the mobile device has been associated with the lockbox;
receiving a message indicating that the mobile device has recognised one or more of the locks;
receiving a message indicating that the mobile device has associated one or more isolation locks with the isolation point according to the isolation plan.

In an embodiment the method further comprises receiving a message indicating that the one or more of the locks have been removed from the lockbox.

In an embodiment the method further comprises receiving a message indicating that the one or more of the locks have been removed from the isolation point.

In an embodiment the method further comprises receiving a message indicating that the one or more of the locks have been returned to the lockbox.

According to a tenth aspect of the invention, there is a method of isolation management comprising:
communicating the isolation plan to a mobile device;
allocating a mobile device to the lockbox according to the isolation plan;
allocating one or more isolation locks to the mobile device according to the isolation plan;
recognising that the mobile device is proximal to the lockbox so that the lockbox may allow access to one or more locks housed therein;
recording recognition of the one or more locks with the mobile device, wherein the one or more locks are each able to be recognised by the mobile device;
associating the one or more locks with the mobile device after recordal of recognition of the locks;
recording recognition of an isolation point with the mobile device when the isolation point has been isolated with the one or more locks according to the isolation plan, wherein the isolation point is able to be recognised by the mobile device;
sending a message to the computer that the one or more locks have been used to isolate the isolation point.

In an embodiment the method further comprises sending a message to the computer reporting association of the mobile device with the lockbox.

In an embodiment the method further comprises sending a message to the computer reporting association of mobile device and each lock.

In an embodiment the method further comprises sending a message to the computer reporting association of mobile device and the isolation point.

In an embodiment the method further comprises recording recognition of the isolation point and the one or more isolation locks when the lock is removed from the isolation point so as to create a de-association of the isolation lock to the isolation point.

In an embodiment the method further comprises sending a message to the computer reporting de-association of mobile device and the isolation point.

In an embodiment the method further comprises recording association of each lock with the lockbox when the lock is returned to the lockbox. In an embodiment the method further comprises sending a message to the computer reporting return of the lock to the lockbox.

Throughout the specification and claims, unless the context requires otherwise, the word "comprise" or variations such as "comprises" or "comprising", will be understood to imply the inclusion of a stated integer or group of integers but not the exclusion of any other integer or group of integers.

DESCRIPTION OF DRAWINGS

In order to provide a better understanding of the present invention embodiments will now be described, by way of example only, with reference to the drawings, in which:—

DETAILED DESCRIPTION OF EMBODIMENTS OF THE INVENTION

Figure 1:
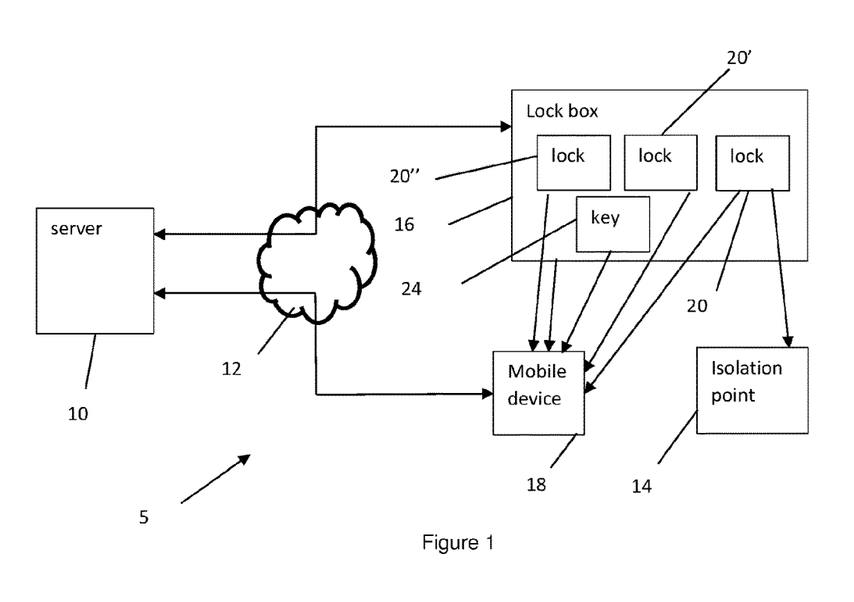
FIG. 1 illustrates a framework model showing the association between the components of a system for isolation management according to an embodiment of the present invention.
Figure 4:
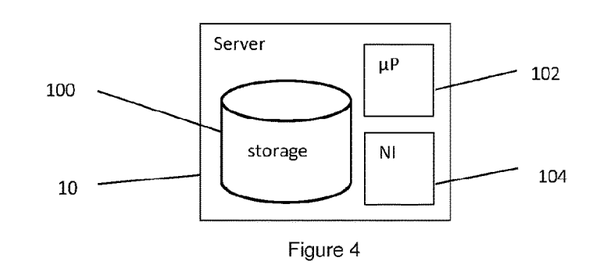
FIG. 4 is a block diagram of a computer according to an embodiment of the present invention.

FIG. 1 shows a system 5 for isolation management having a computer, such as a networked server 10. As seen in FIG. 4, the server 10 comprises a storage 100 for storing a database of records and operating instructions. The storage 100 may be in the form of non-volatile solid state memory or a hard disk drive. The database of records provides information to the server 10, and may be updated by the server 10. The server 10 further comprises a processor 102 for executing the operating instructions so as to control the server 10 according to the operating instructions. The processor 102 is configured for accessing the information of the database of records and generating an isolation plan 80. The server 10 also comprises a network interface 104 for communication with one or more lockboxes 16 and one or more mobile devices 18 over a computer network 12, such as the Internet, a LAN, a WAN, or a VPN. The server 10 may be a personal computer or a dedicated computing system. Examples of the server 10 are the PowerEdge server line by Dell Inc or the BladeSystem server line by Hewlett-Packard Company.

Figure 7:
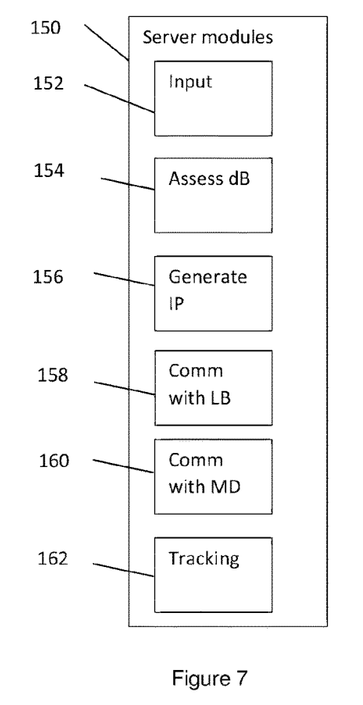
FIG. 7 is a block diagram of functional modules of the computer of FIG. 4 according to an embodiment of the present invention.

Referring to FIG. 7, in an embodiment the server 10 is configured by the operating instructions to operate with the following functional modules 150:

an input 152 for receiving input from a user or other system designating an asset that requires isolation or otherwise requires access control;

a database access module 154 for accessing the database so as to perform queries of the database or to write entries into the database;

a module 156 for generating an isolation plan 80 based on the input and entries in the database;

a module 158 for communicating with the lockbox 16;

a module 160 for communicating with the mobile device(s) 18, 26; and a module 162 for tracking implementation of the isolation plan.

In an embodiment the operating instructions are in the form of instructions of a computer program.

Figure 3:
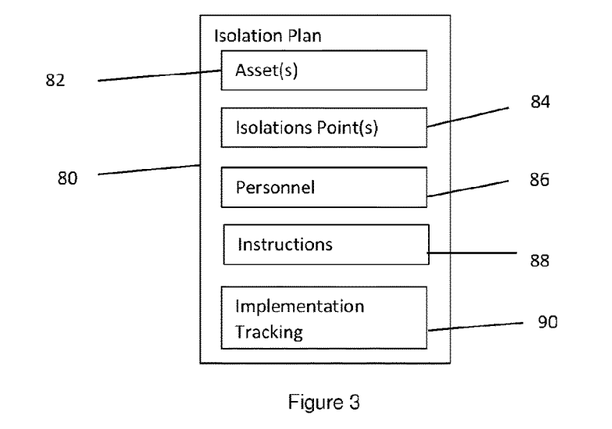
FIG. 3 is a diagram of functional components of an isolation plan used in an embodiment of the present invention.

Referring to FIG. 3, the isolation plan 80 is generated from the information found on the database of records. The information included in the isolation plan 80 comprises: (1) identification 82 of the fixed asset requiring maintenance or repair, (2) identification 84 of a number of isolation points 14 which require isolating to render the fixed asset safe for work, (3) identification 86 of a number of qualified personnel, (4) optionally, a qualified isolation supervisor, (5) instructions 88 for isolation for isolation and/or de-isolation, and (6) tracking information 90 on the implementation of the isolation plan. The instructions 88 provided by the isolation plan 90 highlight to the personnel, and optionally to the isolation supervisor, the locations of the isolation points 14 and clearly identifies the isolation points requiring isolation in order for personnel to be permitted access to work on the asset.

Figure 5:
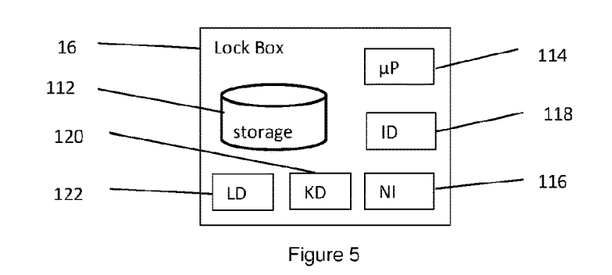
FIG. 5 is a block diagram of a lockbox according to an embodiment of the present invention.

In FIG. 1, a lockbox 16 is shown to be in communication with the server 10 via the network 12. As seen in FIG. 5, the lockbox 16 comprises a processor 114 and a network interface 116 so as to be able to communicate with the server 10. Additionally, the lockbox 16 has a storage 112 in order to receive and store the isolation plan 80 communicated from the server 10 as well as operating instructions. The storage 132 may be in the form of non-volatile solid state memory. The processor 114 executes the operating instructions so as to control components of the lockbox 16 according to the operating instructions. The processor 114 is configured to provide status updates of implementation of the isolation plan to the server 10. The lockbox 16 may be similar to that of the Traka range of key cabinets sold by Assa Abloy Limited.

Figure 8:
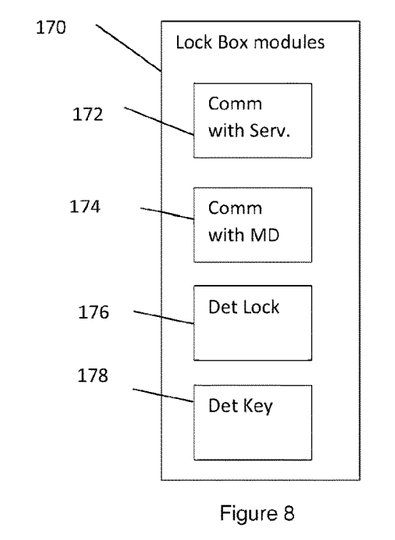
FIG. 8 is a block diagram of functional modules of the lockbox of FIG. 5 according to an embodiment of the present invention.

Referring to FIG. 8, in an embodiment the lockbox 16 is configured by the operating instructions to operate with the following functional modules 170:

a module 172 for communicating with the server 10;

a module 174 for recognising and or communicating with the mobile device(s) 18, 26; and a detection module 176 for detection of the presence or absence of each of the locks 20, 20', 20" in the lockbox 16; and a detection module 178 for detection of the presence or absence of each of the one or more keys 24 in the lockbox 16.

In an embodiment the operating instructions of the lockbox 16 are in the form of instructions of a computer program.

Figure 2:
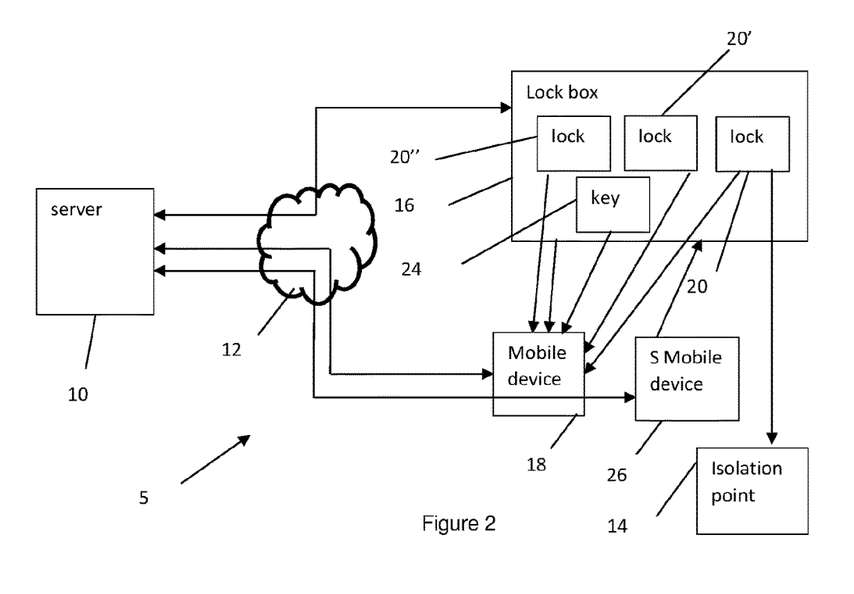
FIG. 2 illustrates a framework model showing the association between the components of a system for isolation management including a verification mobile device according to an embodiment of the present invention.
Figure 6:
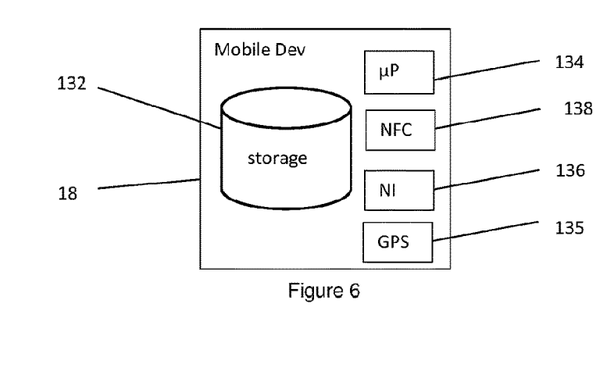
FIG. 6 is a block diagram of a mobile device according to an embodiment of the present invention.

A mobile device 18 is used by the personnel, and in some cases as indicated in FIG. 2 a supervisor's mobile device 26 is used by an isolation supervisor, to communicate with the server 10, via network 12, by use of a network interface 136, to monitor the status of the isolation plan 80 and update the server 10 of the implementation of the isolation plan 80. As seen in FIG. 6, the mobile device 18 is configured to recognise objects, such as the lockbox 16, record the recognition of the objects, and associate or disassociate the objects to the mobile device 18 and to each other by use of a near field communicator 138. In this example, the mobile device 18 recognises objects using radio-frequency identification (RFID), wherein the objects are fitted with RFID tags or chips. It will be appreciated that persons skilled in the art may use other methods for recognising objects such as near field communication or barcode scanning. The mobile device 18 communicates these records and associations to the server 10 in order to update the tracking information 90 in the database of records. The server 10 then communicates these changes to authorised personnel, allowing them to monitor the implementation of the isolation plan 12. The mobile device 18 may be a personal digital assistant, a tablet computer, a smart phone or a dedicated mobile computer terminal. The mobile device 18 comprises a data storage 132 for storing operating instructions and the isolation plan 80. The storage 132 may be in the form of non-volatile solid state memory. The mobile device 18 also comprises a processor 134 for executing the operating instructions so as to control components of the mobile device 18 according to the operating instructions. In an embodiment the mobile device 18 may also have a position determining device 135, such as a GPS receiver, for determining its location.

Figure 9:
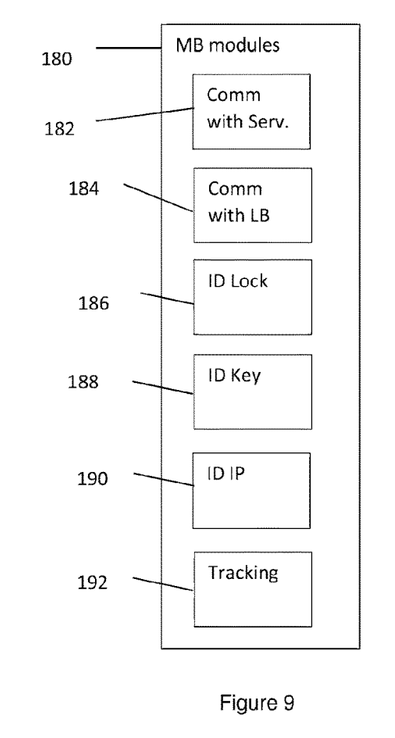
FIG. 9 is a block diagram of functional modules of the mobile device of FIG. 6 according to an embodiment of the present invention.

Referring to FIG. 9, in an embodiment the mobile device 18 is configured by the operating instructions to operate with the following functional modules 180:

a module 182 for communicating with the server 10;

a module 184 for communicating with the lockbox 16; and an identification module 186 for identifying one of the locks 20, 20', 20" in the lockbox 16;

an identification module 188 for identifying the one or more keys 24 in the lockbox 16;

an identification module 190 for identifying the isolation point 14; and a module 182 for tracking implementation of the isolation plan.

In an embodiment the operating instructions of the mobile device are in the form of instructions of a computer program.

The lockbox 16 is rendered accessible or inaccessible upon association with the mobile device 18. The lockbox 16 is configured to recognise the mobile device 18 by the near field communicator 138 using wireless communication, such as near field communication (NCF), and determines whether the mobile device 18 has been allocated to the lockbox 16 according to the isolation plan 12. If the mobile device 18 is recognised as being allocated to the lockbox 16, it is associated to the lockbox 16 and the lockbox 16 allows access to its contents. It will be appreciated that the lockbox 16 may be configured to recognise a mobile device 18 using other means that allow association of the mobile device 18 to the lockbox 16. Additionally, it will be appreciated that the mobile device 18 may be linked to a user, so that the lockbox 16 may identify the user, using an identification card or biometric reading, and associate or disassociate the mobile device 18 to the lockbox 16. If the mobile device 18 is subsequently recognised after its initial recognition by the lockbox 16, the mobile device 18 may be disassociated from the lockbox 16.

One or more isolation locks 20 for isolation locking of the asset according to the isolation plan are contained in the lockbox 16. In one form the locks are padlocks. Each of the isolation locks 20 are configured to be recognised by the mobile device 18. In this example, the isolation locks are recognised by the near field communicator 138 of the mobile device 18 due to an RFID tag attached to the isolation lock or an RFID chip embedded in the isolation lock. However, other forms of recognition may be used, such as by use of a barcode. The associated one or more keys 22 for the locks are also contained in the lockbox 16 and are configured to be recognised by the near field communicator 138 of the mobile device 18 in the same or a similar manner as that of the isolation locks 20. After the mobile device 18 has recognised an isolation lock 20 or key 22, it will be recorded as recognised and associated to the mobile device 18. If the same isolation lock 20 or the key 22 is subsequently recognised, it will be recorded as recognised and disassociated to the mobile device 18.

The lockbox 16 comprises a lock detector 122 configured to recognise the presence or absence of the isolation locks 20 and a key detector 120 configured to recognise the presence or absence of the keys 22. Monitoring for the presence or absence of the isolation locks 20 and the keys 22 by the modules 176 and 178 allows the lockbox 16 to associate or confirm association of the isolation lock 20 and or the key 22 to the mobile device 18. This is advantageous in situations wherein multiple mobile devices 18 are used. Additionally, the communication module 172 of the lockbox 16 is configured to communicate to the server 10 the presence or absence of the isolation locks 20 and keys 22. This allows the tracking module 162 of the server 10 to update the tracking portion 90 of database of records so that authorised staff members may monitor the implementation of the isolation plan 12 by determining the association and disassociation of isolation locks 20 and keys 22 to mobile devices 18, the presence or absence of locks 20, 20', 20" and keys 24 in the lockbox 16, and association of locks 20, 20', 20" with isolation points 14.

In an embodiment the lockbox 16 is further configured with a printer in order to print a hardcopy of the isolation plan 12 in human readable form. The printer may be inherent to the lockbox 16 or may be a printer that is connected to the lockbox 16.

The isolation point 14 for isolating an asset with the one or more isolation locks according to the isolation plan 90 is also configured to be recognised by the module 190 of the mobile device 18. Each isolation point 14 is configured with a RFID tag that can be detected by the near field communicator 138 of the mobile device 18. It will be appreciated that the isolation point 14 may be configured with other means for recognition. The isolation point 14 is associated or disassociated to one or more isolation locks 20 by the mobile device 18. Association occurs when the mobile device 18 is used to initially recognise the isolation point 14. This initial recognition is recorded and indicates that the isolation point 14 has been isolated. The mobile device 18 is then used to recognise the isolation lock or locks 20 in order to associate them to the isolation point 14. Disassociation occurs in a similar way wherein the mobile device 18 is used to initial recognise the isolation point 14 to mark that it was de-isolated. The mobile device 18 is then used to recognise the isolation lock or locks 20 to indicate that they were removed from the isolation point 14. The module 182 of the mobile device 18 communicates the association or disassociation to each isolation point to server 10 so that the tracking portion 90 of the database can be updated.

FIG. 2 shows an embodiment of the invention, wherein a verification mobile device 26 is used alongside the mobile device 18. The verification mobile device 26 is provided authorisation to allow access or disallow access to the lockbox 16. The lockbox 16 is configured to only allow or disallow access to the verification mobile device 26 after the mobile device 18 is firstly associated to the lockbox 16 and the verification mobile device 26 is lastly associated to the lockbox 16. When more than one mobile device 18 is used, it the verification mobile device 26 may only allow or disallow access to the lockbox 16 after all of the mobile devices 18 have been associated to the lockbox 16 first. The verification mobile device 26 will typically be used (allocated to) an isolation supervisor and may have override authority.

The method of operation and use of the system for isolation management will now be described in more detail.

Figure 10:
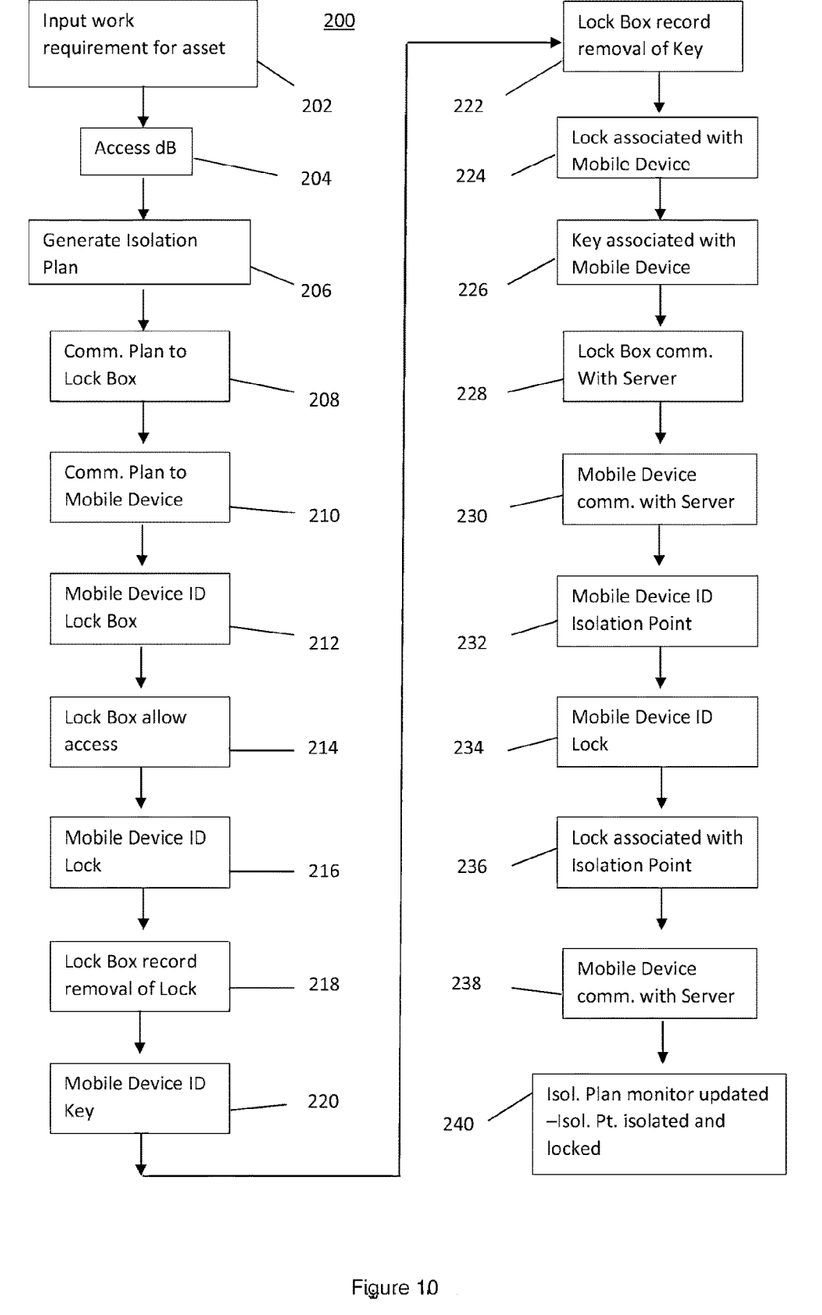
FIG. 10 is a flowchart of a method of isolation and or access control to an asset according to an embodiment of the present invention.

Referring to FIG. 10, the method 200 of the isolation and access control commences with the input module 152 receiving 202 a designation of an asset to which access control and an isolation plan is required, such as when there is a need for maintenance, repair or other work requirements. Based on the input, the database is accessed 204 by module 154 to retrieve details of which personnel are required to perform the isolation, which isolation points 14 are required to be isolated and which locks 20, 20', 20" are required to enforce the isolation of the isolation points 14. The module 156 of the server 10 generates 206 an isolation plan 80 accordingly. A mobile device 18 associated with the appropriate person is allocated to the lockbox 16 according to the isolation plan 80. Additionally, one or more isolation locks 20 contained within the lockbox 16 are allocated to the mobile device 18.

The isolation plan 80 is communicated 208 by module 158 of the server 10 to module 172 of the lockbox 16. The isolation plan 80 is communicated 210 by module 160 of the server 10 to module 182 of the appropriate mobile device(s) 18, 24.

The identification device 118 of the lockbox 16 is used by the communication module 174 to recognise 212 the near field communicator 138 of the mobile device 18. This initial recognition is recorded in order to associate the mobile device 18 to the lockbox 16. The position taken by the GPS 135 of the mobile device 18 may also be recorded for audit and verification purposes. These recordings may be communicated to the server 10 for the tracking module 162 to record implementation of the plan in tracking portion 90. After this association, the lockbox 16 allows access 214 to the one or more isolation locks 20, 20', 20" contained within the lockbox 16.

The near field communicator 138 of the mobile device 18 is used by the identification module 186 to recognise 216 the one or more isolation locks 20 allocated to it, according to the isolation plan 80. The mobile device 18 then records recognition of the one or more isolation locks 20 in order to associate 224 the one or more isolation locks 20 to itself and by implication the user of the mobile device 18. The position taken by the GPS 135 of the mobile device may also be recorded for audit and verification purposes. These recordings are communicated 228 by module 182 to the module 160 of the server 10 and allow the server 10 to update tracking portion 90 of the plan 80 in the database of records indicating that the person allocated the mobile device 18 has taken the one or more isolation locks 20 and are implementing the isolation plan 12. This is verified by the module 176 recording 218 the removal of the lock 20 as detected by detector 122. This is communicated 228 to the server 10.

The key 24 to the locks 20, 20', and 20" is recognised 220 by module 178 and the removal of the key 24 from the lockbox 16 is detected by detector 120. The key is associated 226 with the mobile device 18. This is verified by the module 178 recording 222 removal of the key 24 as detected by detector 120. This is communicated 228 to the server 10. The module 182 of the mobile device 18 also communicates 230 the associations with the locks 20, 20', 20" and keys 25 to the server 10.

The one or more isolation locks 20 are then taken to the isolation point 14 and used to isolate the isolation point 14 according to the isolation plan 12. The mobile device 18 is then used to recognise 232 the isolation point 14 and record the recognition. The mobile device 18 then recognises 234 the one or more isolation locks 20 used to isolate the isolation point 14. By the recordal of recognition of the isolation point 14 and corresponding lock 20, the corresponding lock 20 is associated 236 to the isolation point 14 and is thus regarded as being used to isolate the isolation point 14. The position taken by the GPS 135 of the mobile device may also be recorded for audit and verification purposes. These are communicated 238 by the mobile device 16 to the server 10, which allows the server 10 to update 240 information 90 in the database of records to indicate that the isolation point 14 is now isolated.

The lockbox 16 may be used to print a hardcopy of the isolation plan using a printer that is part of the lockbox 16. Typically, the printing of the hardcopy will be conducted by the user of a mobile device 18 when they first associate the mobile device 18 to the lockbox 16. The printed copy of the isolation place may be used as a manual backup, for a compliance check or for audit purposes.

The de-isolation of the isolation point 14 and the subsequent disassociation and return of the one or more locks 20 and the one or more keys 22 to the lockbox 16 are conducted in reverse to the method that was initially detailed.

The isolation point 14 and the one or more isolation locks 20 used to isolate the isolation point 14 are recognised and recorded as recognised by the mobile device 18. Subsequently, the isolation point 14 and the one or more isolation locks 20 are disassociated from each other and the isolation point 14 is desolated from the one or more isolation locks 20 using the one or more keys 22. Again the position of the mobile device may again be recorded for audit and verification. The one or more isolation locks 20 and the one or more keys 22 are returned to the lockbox 16. The mobile device 18 is used to recognise and record recognition of the one or more isolation locks 20 and the one or more keys 22 in order to disassociate them from the mobile device 18. Subsequently, the lockbox 16 recognises and records recognition of the mobile device 18 in order to disassociate it from the lockbox 16. Again the position of the mobile device may again be recorded for audit and verification. Other forms of "geofencing" may be used, such as near field proximity detection of a carried near field device by personnel, to record the location of workers.

A verification mobile device 26 may be issued to the isolation supervisor in order to access or disallows further access to a lockbox 16. In this situation, the verification mobile device 26 must be the last device recognised by and associated to the lockbox 16 before it is accessed otherwise the lockbox 16 disallows further access to the lockbox 16. The lockbox 16 will recognise the mobile device 18, record the recognition and associate the mobile device 18 to itself.

If more than one mobile device 18 is used, the lockbox 16 will recognise and record recognition of these mobile devices 18 before associating the mobile devices 18 to itself. Once the mobile device 18 has been associated by the lockbox 16, the verification mobile device 26 will be recognised and recorded as recognised by the lockbox 16. If the mobile device 18 or mobile devices 18 are all associated to the lockbox 16 before the recognition of the verification mobile device 26, the verification mobile device 26 will be associated to the lockbox 16 and granted access. If the verification mobile device 26 was recognised before the mobile device 18 or all of the mobile devices 18 are associated with the lockbox 16, the lockbox 16 will not allow access. To disallow access to the lockbox 16, the verification mobile device 26 and the mobile device 18 are instead disassociated from the lockbox 16 rather than associated to.

Figure 11:
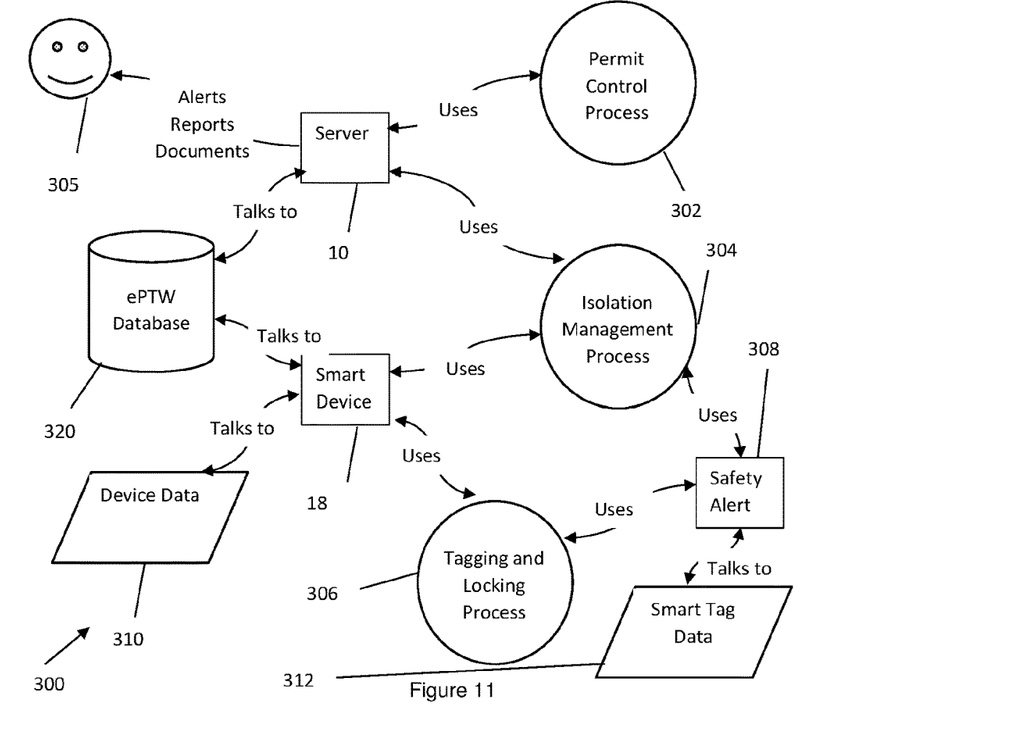
FIG. 11 is a conceptual data flow diagram.

FIG. 11 shows data flow 300 of an embodiment of the invention. The server 10 stores and retrieves information from a database 320 stored on the server's storage 100. The mobile device 18 stores and retrieves information from the database 320 stored on the server's storage 100. The server 10 uses a permit control process 302 as well as an isolation management progress 304. The permit control process 302 is a progress by which assess/isolation permits are issued and maintained. The isolation management process is a progress by which an asset is isolated. The mobile device 18 uses a tagging and locking process 306 and the isolation management process 304. The tagging and locking process is a process by which a person tags a smart tag to provide access control or otherwise indicate a present at a location and by which a person isolation locks an asset. The smart tags generate smart tag data 312. The mobile device generates and accesses device data 310. A safety alert system 308 monitors the smart tag data 312 and applies the isolation management process 304 and the tagging and locking process 306 to ensure safety requirements are met and can create an alert if that is not the case. The server 10 can generate alerts, reports and documents for stakeholders 305.

Figure 12:
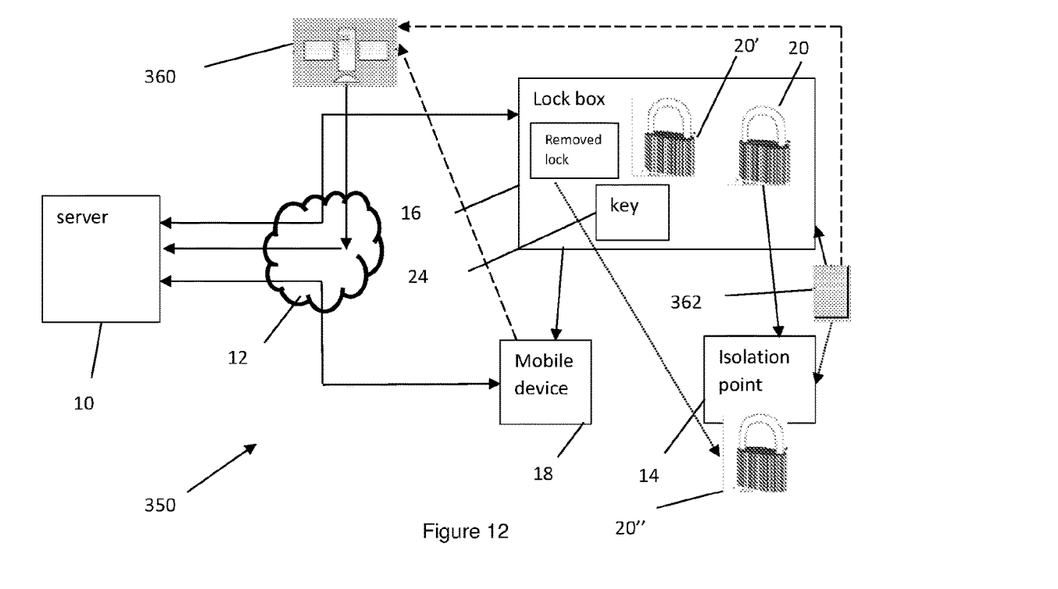
FIG. 12 is an alternative illustration of a framework model showing the association between the components of a system for isolation management according to an embodiment of the present invention.

FIG. 12 shows an alternative system 350 for isolation management having the networked server 10, the lockbox 16 in communication with the server 10 via the network 12 and a mobile device 18. Additionally there is a location monitoring device 360 and a smart tag 362. The location monitoring device 360 may include a Global Positioning System (GPS), smart beacons, or other geofencing technology for monitoring the position of the mobile device 18 and the smart tag 362. The smart tag 362 may be a near field tag, such as an RFID tag. In this embodiment an isolation lock 20" has been removed from the lockbox 16 is being used to isolation lock an asset at an isolation point 14. The smart tag may be used as an alternative or in addition to gain access to the lock box and to record the present of an authorised person at the isolation point 14 so as to implement the isolation plan 80. These additional measures can provide additional levels of security and or audit. Further authorised smart tags can provide override capability for a supervisor in a similar manner to the mobile device 26. Further still in the event of a person leaving a specified geofenced area, with an isolation lock, key or without removing an isolation lock, the location monitoring system 360 is able to detect this and if this movement is not permitted or undesired an alert can be created. For example if a worker forgets to isolate or de-isolate an asset and begins heading off-site an alert can be created.

Figure 13:
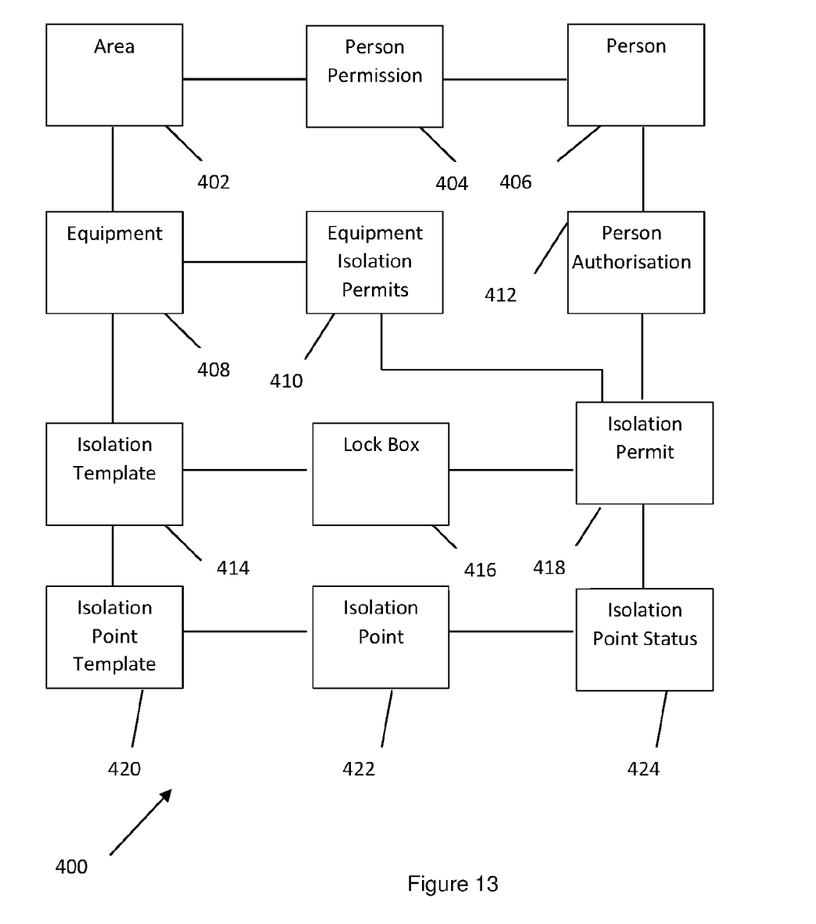
FIG. 13 is a relational diagram of a database structure used in an isolation plan according to an embodiment of the present invention.

FIG. 13 shows an embodiment of an architecture 400 used in the creation of an isolation plan 80. Assets 408 (including but not limited to equipment) are located in an area 402. Each area will have people that are permitted in that area 404. Each person 406 will have certain authorisations 412 for what they are permitted to do, including being able to (or not) isolate certain assets. Each asset requiring isolation will have the need for isolation permits 410. Each asset will have an isolation template 414 which specifies the isolation requirements of that type of asset. Each isolation requirement has an isolation point template 420 which specifies where and how to isolate each isolation point 422 of the asset. For example an asset may have a switch, valve or control, each of which may separately have an isolation point in order to isolate the asset. The isolation template specified the requirements of a lock box 416 for isolation of the asset. For example the asset may have 3 isolation points, and therefore the lock box will require 3 locks. An isolation permit 418 is issued to a person according to the permits required for the asset 410 and the authorisations 412 of a person. The isolation permit is provided to the lock box so it can allow access to the lock to an authorised person. As the authorised person implementing the isolation plan implements the plan by isolation the isolation points implementation of the plan is monitored 424 including monitoring the isolation point's isolation status.

The present invention may be used with multiple lockboxes, mobile devices, locks and isolation points for multiple assets on the one property or across a number of premises. Specific combinations of locks and people may therefore be designated for specific isolation points depending on the required isolation or access control task.

Modifications may be made to the present invention within the context of that described and shown in the drawings. For example the isolation plan can be used as an access control plan, to permit access to certain areas in which only authorised personnel are permitted. For example only an electrician may be permitted access to an electrical switchboard, or only persons with a confined space permit may work in a confined space. In these cases an isolation or access control lock may be normally installed on the equipment and the de-isolation embodiment by be used to permit access to these types of assets.

Such modifications are intended to form part of the invention described in this specification.

What is claimed is:

1. A system of isolation management comprising:
 a computer for generating an isolation plan;
 a lockbox configured to receive the isolation plan from the computer;
 a mobile device associated with an individual, the mobile device being allocated to the lockbox according to the isolation plan, wherein the lockbox is configured to recognise the mobile device when proximal to the lockbox;
 one or more isolation locks for isolation locking of an asset by each individual according to the isolation plan, the one or more isolation locks removably housed in the lockbox, wherein the one or more isolation locks are each able to be recognised by the mobile device and the mobile device is configured to record an association of one or more of the isolation locks to the mobile device according to the isolation plan;
 an isolation point for isolating the asset with the one or more isolation locks according to the isolation plan, the isolation point is able to be recognised by the mobile device;
 whereby in use the lockbox records recognition of the mobile device and the association of the mobile device to the lockbox, the mobile device records recognition of the one or more isolation locks and association of the one or more isolation locks to the mobile device, the mobile devices records recognition of the isolation point and the one or more isolation locks and association of the isolation point to the one or more isolation locks when the one or more isolation locks are used to isolate the isolation point.

2. A system according to claim 1, further comprises one or more keys for the isolation locks, the one or more keys being removably housed in the lockbox, wherein mobile device is configured to recognise each of the one or more keys.

3. A system according to claim 1, wherein the lockbox is configured to recognise the presence or absence of each of the one or more isolation locks and or each of the one or more keys.

4. A system according to claim 1, wherein the lockbox is configured to communicate to the computer the presence or absence of the one or more isolation locks and or the one or more keys.

5. A system according to claim 1, wherein the server is configured to inform an authorised person of the implementation of the plan after receiving communication from the lockbox.

6. A system according to claim 1, wherein the server is configured to inform an authorised person of the implementation of the plan after receiving communication from the mobile device.

7. A system of isolation management comprising:
a computer for generating an isolation plan, the isolation plan comprising a plan for de-isolation of an isolated asset;
a lockbox configured to receive the isolation plan from the computer;
a mobile device associated with an individual, the mobile device being allocated to and associated to the lockbox according to the isolation plan, wherein the lockbox is configured to recognise the mobile device when proximal to the lockbox;
one or more isolation locks for isolation locking of an asset according to the isolation plan, the one or more isolation locks able to be removably housed in the lockbox, wherein the one or more isolation locks each able to be recognised by the mobile device and are associated to the mobile device according to the isolation plan;
an isolation point being isolated with the one or more isolation locks removed from the lockbox according to the isolation plan, wherein the isolation point is able to be recognised by the mobile device, wherein the isolation point is associated to the one or more isolation locks when isolating the isolation point;
whereby in use the mobile device is arranged to record recognition of the isolation point and the one or more isolation locks isolating the isolation point when the isolation point is de-isolated from the one or more isolation locks thereby de-associating the one or more isolation locks with the one or more isolation points, the mobile device is able to record recognition of the one or more isolation locks when the one or more isolation locks are re-housed in the lockbox thereby de-associating the one or more isolation locks from the mobile device, and
wherein the lockbox is able to record recognition of the mobile device thereby de-association the lockbox from the mobile devices.

8. A lockbox for housing one or more isolation locks used in access control of an asset, said lockbox comprising:
a receiver for receiving an isolation plan from a computer;
wherein the isolation plan comprises an allocation of one or more mobile devices to the lockbox, wherein the lockbox is configured to recognise the one or more mobile devices when proximal to the lockbox;
wherein the one or more isolation locks are removably housed in the lockbox;
whereby in use the lockbox is configured to associate with each of the recognised one or more mobile devices and permit access to the one or more isolation locks.

9. A method of solation management comprising:
generating an isolation plan;
communicating the isolation plan to a lockbox, the lockbox containing one or more isolation locks for isolation locking;
allocating a mobile device to the lockbox according to the isolation plan;
recognising that the mobile device is proximal to the lockbox and recording recognition of the mobile device with the lockbox;
associating the mobile device to the lockbox after recordal of cognition of the mobile device;
allocating one or more of the one or more isolation locks to the mobile device according to the isolation plan;
recording recognition of the one or more isolation locks with the mobile device, wherein the one or more isolation locks are each able to be recognised by the mobile device;
associating the or each recognised isolation lock with the mobile device after recordal of recognition of the isolation locks;
removing the or each isolation lock associated with the mobile device from the lockbox;
isolating an isolation point with the or each removed isolation lock according to the isolation plan;
recording recognition of the isolation point with the mobile device, wherein the isolation point is able to be recognised by the mobile device;
recording recognition of the or each isolation lock used to isolate the isolation point, with the mobile device;
associating the isolation point to the or each isolation lock used to isolate the isolation point.

10. A method according to claim 9, wherein the method further comprises the mobile device communicating to the server recordal of recognition and associations of the one or more isolation locks to the isolation point.

11. A method according to claim 9, wherein the method further comprises the recording recognition of the one or more keys for the isolation locks, wherein the one or more keys are each able to be recognised by the mobile device and associated to the mobile device after recordal of recognition.

12. A method according to claim 9, wherein the method further comprises recognising the presence or absence of the one or more isolation locks and or the one or more keys by the lockbox.

13. A method according to claim 9, wherein the method further comprises communicating to the server the presence or absence of the one or more isolation locks and the one or more keys by the lockbox.

14. A method according to claim 9, wherein the communicating to the server the presence or absence of the one or more isolation locks and the one or more keys by the lockbox causes the server to inform an authorised staff member of the progress in implementation of the isolation plan.

15. A method according to claim 9, wherein the communicating to the server the association of the lock to the isolation point causes the server to inform an authorised staff member of the progress in implementation of the isolation plan.

16. A method according to claim 9, wherein the method further comprises allocating the one or more isolation locks and or the one or more keys to the mobile device, according to the isolation plan.

\* \* \* \* \*